United States Patent [19]

Nalbandian

[11] Patent Number: 4,962,613
[45] Date of Patent: Oct. 16, 1990

[54] PLANT GROWING SYSTEM

[76] Inventor: A. Eugene Nalbandian, 1741 Brookdale, La Habra, Calif. 90631

[21] Appl. No.: 464,330

[22] Filed: Jan. 12, 1990

Related U.S. Application Data

[63] Continuation-in-part of Ser. No. 231,873, Aug. 12, 1988.

[51] Int. Cl.⁵ .............................................. A01G 25/00
[52] U.S. Cl. ............................................ 47/79; 47/71
[58] Field of Search .................. 47/66, 79, 81, 82, 31, 47/71

[56] References Cited

FOREIGN PATENT DOCUMENTS 240365 10/1987 European Pat. Off. ................ 47/66

Primary Examiner—Henry E. Raduazo
Attorney, Agent, or Firm—Knobbe, Martens, Olson & Bear

[57] ABSTRACT

Disclosed is an apparatus and method for growing plants, the apparatus having a container, a soil support platform positioned within the container having an elevated portion and a trough, and a tube for transmitting water and oxygen below the platform. The container has a plurality of holes in its side at a height similar to or slightly above that of the elevated portion of the platform so as to permit direct flow of oxygen from outside the container to the soil on the platform. The trough has a plurality of holes to allow water in the trough thus allowing the soil to take up water by capillary action. The elevated portion of the platform also has a plurality of holes to allow the oxygen to travel beneath the platform and into the soil. The apparatus is best used with soil that is a combination of peat, wood particles, and, and perlite to facilitate capillary feeding.

31 Claims, 3 Drawing Sheets

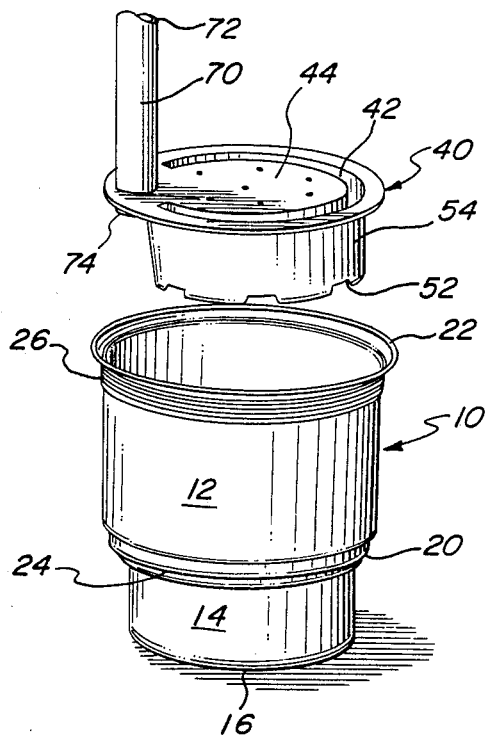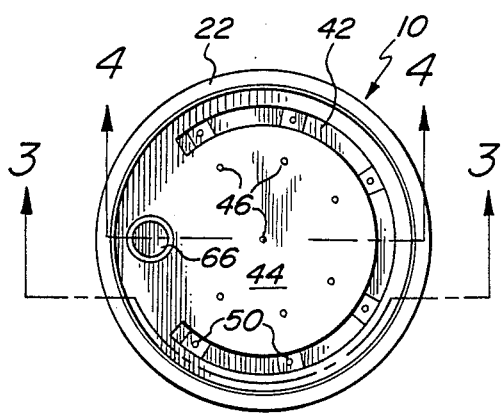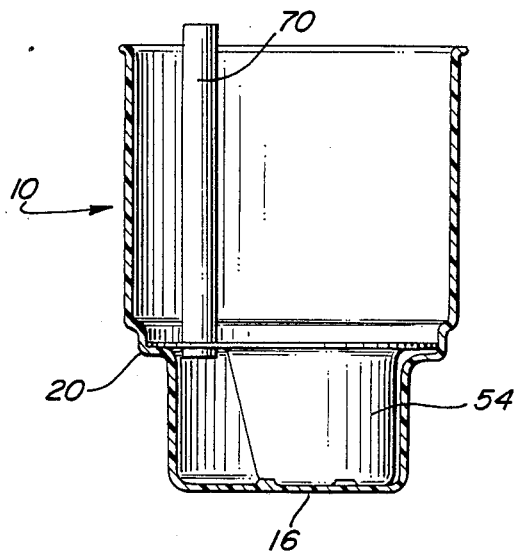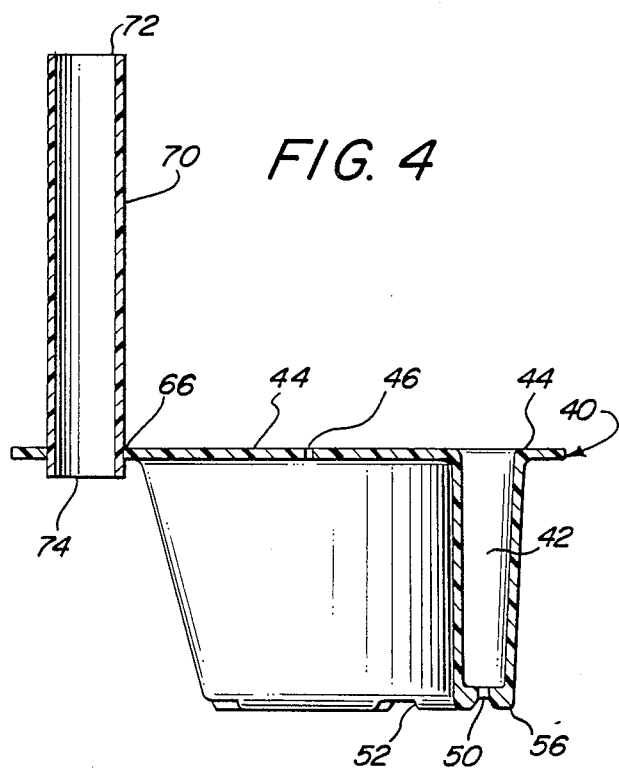

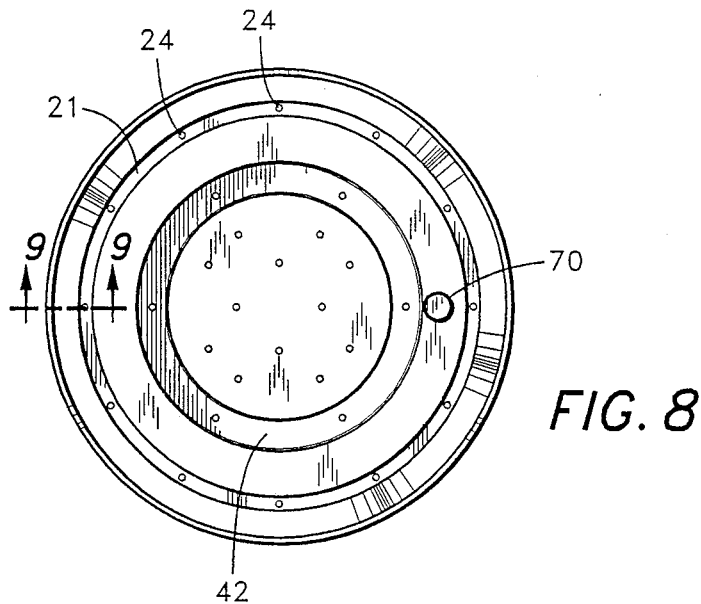
FIG. 8
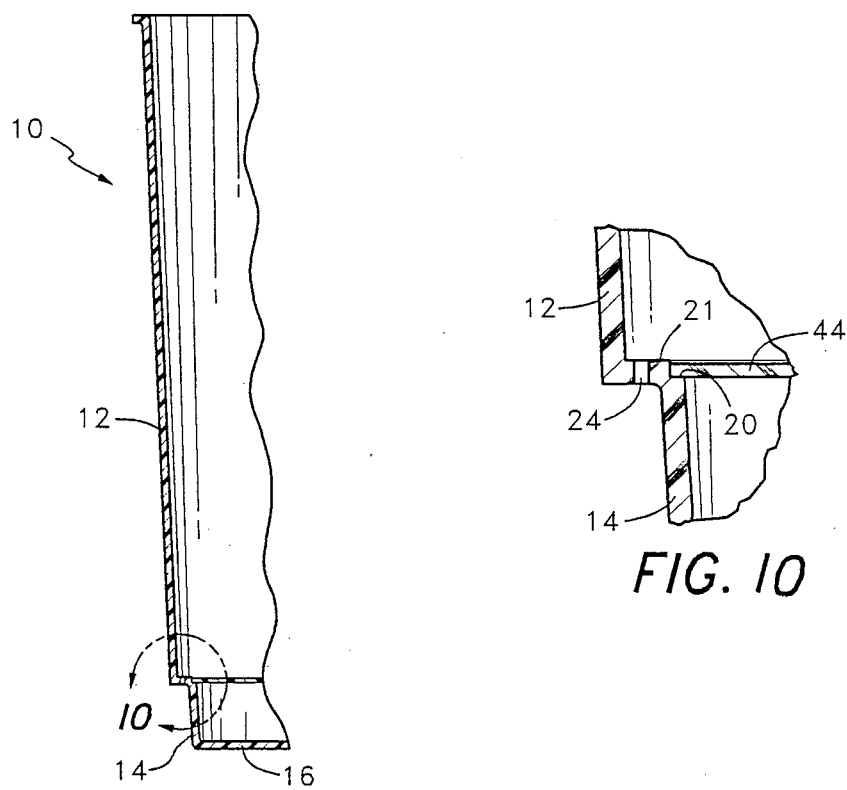
FIG. 9
FIG. 10

PLANT GROWING SYSTEM

RELATED APPLICATIONS

The present application is a continuation-in-part of a copending application, Ser. No. 231,873, filed Aug. 12, 1988.

BACKGROUND OF THE INVENTION

The present invention relates to plant growing systems, particularly to a new, improved apparatus and method for growing plants in a portable self-contained container.

Most potted plants die prematurely due to the stressful environment created by the plant's owner. That stressful environment is primarily caused by the overwatering of the soil which in turn, because of the reduced porosity of the soil, prevents the presence of oxygen near the plant's roots. Indeed, approximately 80–85% of all potted plants die prematurely due to excessive water levels in the container, commonly known as the overwatering syndrome. Prior systems do not allow for proper drainage to prevent overwatering. Plant owners have long sought for plant containers and soil compositions which could overcome the stressful effects of overwatering. Conversely, plant owners do not want to risk underwatering either.

It is well known that plants should be watered by subirrigation systems. That is, plant growers have always appreciated the benefits of having a water reservoir beneath the soil bed from which the plant could draw water, just as nature provides water for all outdoor plants. One method of drawing water up to the plant was by using wicks or sponges. However, those devices proved ineffective and, because of their quick deterioration, needed to be replaced frequently. Moreover, wicks and sponges fail to evenly distribute the water throughout the soil. The preferred method is by soil capillary action.

Soil will draw up water by capillary action, a phenomenon caused by the adhesion of water molecules to soil particle surfaces due to surface tension. Watering by use of a subirrigated reservoir, particularly by capillary action, allows the plant owner to water the plant less frequently. Moreover, using capillary action directly through the soil eliminates the need for wicks or sponges.

Wholesale growers desire water reservoir systems realizing that their plants will not get watered during shipment or while sitting with a retailer awaiting final sale, a time period which could be months. Unwatered plants which die prior to final sale are costs that traditionally are borne by the wholesale grower.

Moreover, a water reservoir eliminates the need to supply water to the plant by overhead watering. Because many growers water by overhead sprinkler systems, the elimination of such systems reduces the amount of water needed to maintain plants. For large commercial growers, the water saved is quite substantial. Moreover, when water is not supplied by overhead watering, pesticides are not washed off leaves and are effective longer. Plants are sprayed less frequently, resulting in a substantial savings for the grower and reduced risk to the environment.

Overhead watering flushes and removes plant nutrients from the soil nutrients. By using a water reservoir and capillary action, soil nutrients remain in the soil. Concomitantly, due to inverted leaching, certain compounds, such as salt, which are harmful to the plant when concentrated near roots, will steadily move out of the primary root zone as fresh water rises out of the reservoir.

It is also known that most plants thrive in humid conditions. Water reservoirs cause much humidity around the plant's foliage, creating a beneficial environment for the plant.

The prior art shows several types of subirrigation watering systems. See, for example, Hitchcock U.S. Pat. No. 1,221,499; Moriarty U.S. Pat. No. 2,387,340; Potain U.S. Pat. No. 3,381,410; Bigglestone U.S. Pat. No. 4,171,593; Magee U.S. Pat. No. 4,183,175; and Smith U.S. Pat. No. 4,236,351. Each recognize some of the aforementioned advantages of subirrigation watering systems. However, many of the systems are unduly complicated and thus cannot be produced at a reasonable cost. Some of those systems, such as the devices disclosed in the patents to Moriarty and Potain, employ an inner and outer container wherein the outer container merely holds water for the soil contained in the inner container. Others, such as the devices shown in the patents to Magee and Smith, do not provide for a means to guarantee that the soil will never be overwatered. Other devices, such as the ones disclosed in the patent to Magee and in Wong and Carlisle U.S. Pat. Nos. 3,868,787 and 4,179,846, respectively, are directed to hydroponic plants, those with roots immersed in a soilless solution.

Another critical problem with prior subirrigation plant watering systems is the inability to supply sufficient amounts of oxygen to the soil and plant root structure. As previously discussed, an aerobic environment is crucial to the well being of a plant. Devices which have outer containers filled with water to be drawn in by the soil in the inner container do not allow oxygen around the saturated soil, and consequently, roots deteriorate.

Another problem with many other planters is the inability to control plant parasites and disease organisms near the bottom of the container. This harmful growth is facilitated by planters which have holes near the bottom of the container. Some states, particularly California, require that commercial growers minimize disease and thus require growers to place the container well above the ground. Such steps are also necessary for the grower to obtain state certification, which indicates that he has taken the necessary precautions against nematodes. Thus, it would be desirable to have no holes near the bottom of the container but still provide proper drainage in the event of overwatering. In addition, by having no such holes, the container will prevent water contamination, another problem faced by all commercial growers.

Moreover, many planters with water reservoirs have no means for preventing the spillage of the water when the plant is being moved. Many prior art devices tend to be too messy for certain uses, such as for use in the home or office. It is, therefore, advantageous if the water reservoir is not free to pour out of the container but still be accessible for periodic refilling.

Another advantage of the container holes as disclosed in the present invention is that they allow soil nutrients to remain in the water reservoir for recirculation into the soil bed. When water enters the soil by overhead watering or rainfall, excess water will leave by the container holes rather than mixing with the nutrient-rich water in the reservoir and flushing the reservoir water out of the reservoir. This conserves nutrients and minimizes contamination of the environment. The prior art devices with container holes force mixing of the overhead water with the reservoir water.

Thus, the plant grower, whether at home, in the office or at the commercial nursery, require an inexpensive, simple plant growing system which would provide the proper amount of water and oxygen to the plant so as to eliminate the harmful effects caused by overwatering. Also, there is a need for a less complicated and thus less costly planter having all of the benefits of capillary feeding. The grower also needs a planter that will prevent excessive water spillage during the transportation of the plant but still wants all of the benefits of a system that uses capillary feeding.

Although the present invention has various objectives, they will become apparent upon reading the following detailed description of the preferred embodiment.

SUMMARY OF THE INVENTION

The present invention is an apparatus and system for growing plants in which the plant draws water from a water reservoir to the plant's roots by capillary action through the soil so that the soil is never oversaturated and where the soil and the roots are able to be surrounded by oxygen to provide the most beneficial environment for the plant's growth. The apparatus comprises an open container, and a platform positioned within the container having an elevated portion and a trough portion, which has a plurality of trough holes, so that soil may be placed in the container and in the trough portion and on the elevated portion. The invention also comprises a watering tube which extends through the platform having a first end proximate the platform and a second end proximate with the upper edge of the container. The tube permits the introduction of water, oxygen and fertilizer beneath the platform and into the trough portion of the platform so that the plant and soil can draw water from the trough by capillary action. Also is provided a plurality of container holes above the base of the container so that the plant may never be overwatered. It is preferred that the holes be at a level substantially even with or slightly above the height of the platform.

In another preferred embodiment, the container is circular and is translucent so that the water level in the water reservoir can be easily detected. In another embodiment, the elevated portion of the platform has a plurality of holes for the transmission of oxygen to the soil. The invention also is a method for preparing the soil to be placed in the planter in order to get the most beneficial effects of using the disclosed apparatus. Preferably, that soil comprises some mixture of wood particles, different peats, sand, and perlite.

BRIEF DESCRIPTION OF THE DRAWINGS

FIG. 1 shows an exploded perspective view of a preferred embodiment of the present invention.

FIG. 2 shows a top plan view of a preferred embodiment of the present invention.

FIG. 3 is a cross-sectional view taken along the line 3—3 in FIG. 2.

FIG. 4 is a cross-sectional view taken along the line 4—4 in FIG. 2.

FIG. 8 shows a top plan view of another preferred embodiment of the present invention.

FIG. 9 is a cross-sectional view taken along the line 9—9 of FIG. 8.

FIG. 10 is an enlarged sectional view of the segment encircled in FIG. 9.

DETAILED DESCRIPTION OF THE PREFERRED EMBODIMENTS

Figure 5:
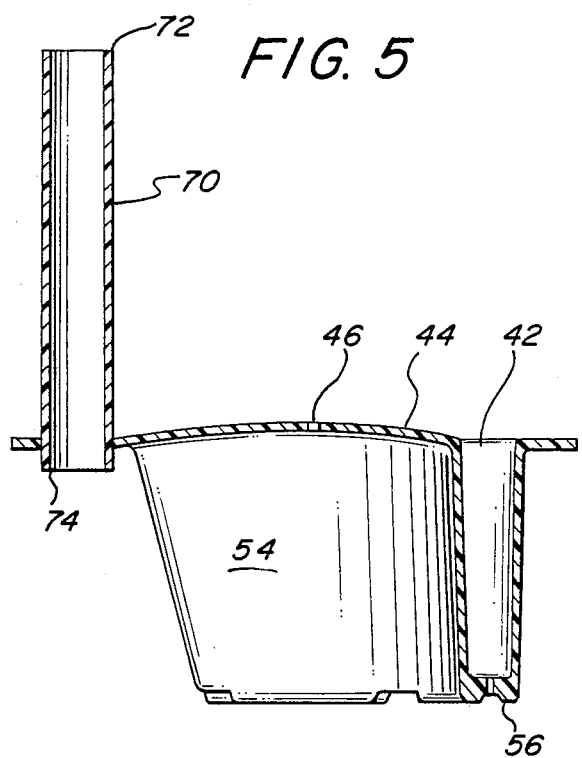
FIG. 5 is a cross-sectional view of a preferred embodiment of the platform, trough, and watering tube.

FIG. 1 discloses the three basic components of the present invention: the container 10, the platform 40, and the watering tube 70.

The container 10 can be of various shapes and sizes. The container shapes can be designed to facilitate stacking during shipping and storage. Preferably it is circular as shown in FIG. 1. As is well known, containers of this sort can be made with various types of materials, preferably with an inexpensive plastic. The other components of the present invention can also be made with similar materials. More preferably, however, the container material is translucent so that water levels within the container can be detected by a visual inspection of the exterior sides of the container. For outdoor plants, the color of the container 10 preferably is black to screen out ultraviolet rays. The container 10 can be placed inside a decorative pot (not shown) and thus acts as a liner for that pot.

The container 10 comprises of upper portion 12, lower portion 14, and base 16. In a preferred embodiment, the diameter of the container at lower portion 14 is smaller than the diameter at upper portion 12. That increase in diameter occurs at ledge 20 which separates upper portion 12 and lower portion 14. A plurality of container holes 24 are evenly spaced about ledge 20. Preferably, the container holes 24 are vertically oriented through the ledge 20. However, the holes 24 could be above the ledge 20 or platform and just go through the container in the upper portion 12. Even more preferably, there are two ledges 20 and 21, and the container holes go through the upper ledge 21 as shown in FIG. 10. Best results are achieved if the upper ledge is approximately 1/32 of an inch above the platform surface. Unlike most prior art devices, the container has no holes near the base so that disease organisms and parasitic growth are minimized and the lower portion can hold water. Preferably, the container holes 24 are not below the ledge 20 to even further reduce the possibility of disease organisms and parasitic growth. That is, the container holes 24 should permit direct fluid communication between outside the container 10 and inside the upper portion 12.

At the upper edge of upper portion 12 is a lip 22. Near lip 22, there preferably are a plurality of ribs 26 so that the grower can more easily grab the container by its side.

To be positioned within container 10 is platform 40. The platform consists of elevated portion 44 and a trough portion 42. Elevated portion 44 can be flat, but preferably it is sloped to prevent water from resting thereon. In that embodiment, preferably elevated portion 44 forms a mound with the highest point near its center as is illustrated in FIG. 5. In a top plan view, the elevated portion 44 will take a shape substantially similar to the interior shape made by a horizontal cross-section of container 10 as shown in FIG. 2. If a circular container 10 is used, the diameter of platform 40 is substantially similar to the inside diameter of upper portion 12 so that when positioned within container 10, the platform 40 will rest on ledge 20. Preferably, the diameter of the platform 40 is slightly less than the upper portion 12 of the container 10 so that it can rest on the ledge 20 but not obstruct the openings formed by the container holes 24. One way to keep the container holes unobstructed is to form ledge 20 adjacent to container holes 24 so as to form an upper ledge 21 as shown in FIGS. 8-10. This allows oxygen to flow more freely into the soil to promote better root propagation.

Trough 42 is comprised of side walls 54 and floor 56. Side walls 54 are substantially parallel to each other and floor 56 is substantially parallel with base 16. However, it is understood that the trough can be in any other configuration as long as the lowermost portion is below the elevated portion 44, i.e., U-shaped, V-shaped. The platform, preferably, is supported by side walls 54 of trough 42 as well as by the ledge 20. That is, preferably, the trough 42 is deep enough so that floor 56 contacts base 16 to support elevated portion 44.

Figure 6:
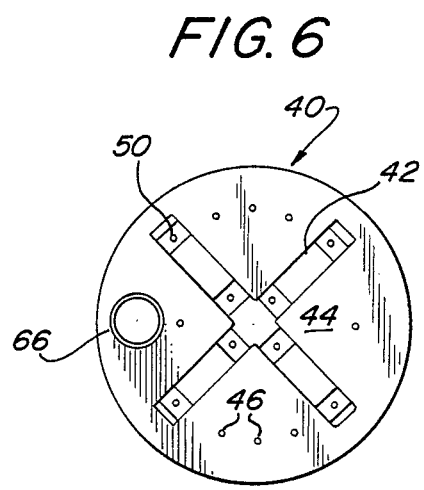
FIG. 6 is a top plan view of the platform illustrating another configuration of the trough.

As shown in FIG. 2, the trough 42 may travel along the outside of platform 40 and preferably runs parallel to container 10. At floor 56 is a plurality of indentations 52 where the floor 56 does not directly contact base 16. Protrusions or strips of material on floor 56 which would raise the trough 42 above base 16 would perform a similar function. Near the center of each indentation is a trough hole 50 sufficiently large enough to allow the passage of water therethrough. However, the size of the trough hole 50 will not be so great as to allow excessive amounts of soil to seep through the hole and onto base 16 of container 10. It is understood that the trough 42 in top plan view may travel in various configurations within platform 40, however, it is believed that the preferred configuration is the C-shaped or circular-shaped one shown in FIGS. 2 and 8. Nevertheless, for the sake of completeness, FIG. 6 depicts another configuration of the trough 42 in top plan view which resembles the letter X, having a criss-crossed configuration.

Within the elevated portion 44 of platform 40, preferably, there are a plurality of platform holes 46, as well as a tube hole 66 to allow the passage of a watering tube 70. As with trough holes 50, the platform holes 46 are small enough to prevent much soil from falling from elevated portion 44 into a water reservoir 80. In addition, holes may be placed through side walls 54 to quicken air and water transmissions.

Figure 7:
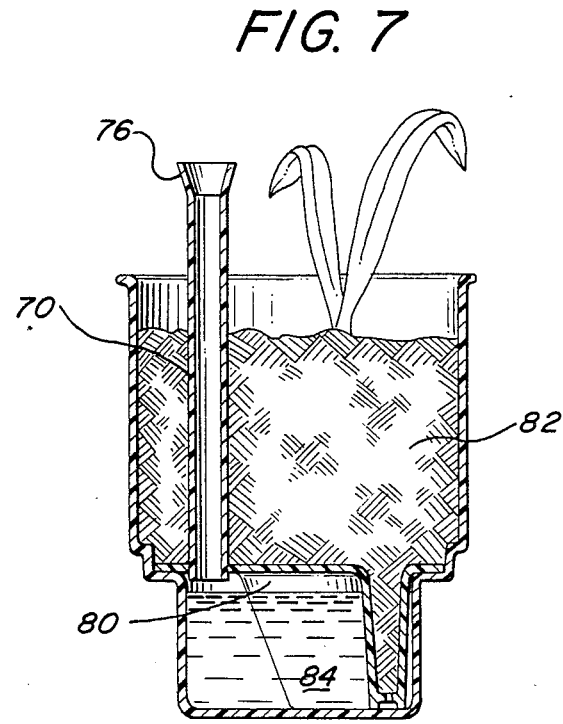
FIG. 7 is a cross-sectional view of a preferred embodiment of the present invention containing soil and water.

Watering tube 70 has a first end 74 and a second end 72. The first end 74 is preferably near the underside of elevated portion 44 of platform 40. The second end 72 is preferably near lip 22 of container 10. It is understood that the watering tube need only be of a length sufficient to rise above the upper level of the soil 82 as shown in FIG. 7. It is also understood that the watering tube 70 may be connected to an automatic watering feed line so that water may be automatically introduced into container 10. Within the watering tube 70, an evaporation regulator and water measuring device may be included. The diameter of the tube 70 would be of a size to accommodate watering feed line and proper intake of water. Watering tube 70 may be integral with either the container 10 or the platform 40. If the grower manually refills the container 10, the second end 72 may have a diameter greater than the first end 74 forming a funnel 76 as shown in FIG. 7 to facilitate pouring water through tube 70. The watering tube 70 also allows oxygen to flow below the platform 40 and into the soil.

FIG. 3 shows the apparatus in its fully assembled condition without the soil and plant in container 10. FIG. 7 shows the apparatus filled with the soil 82, and the water 84 in water reservoir 80. The grower merely places the soil 82 on top of the platform 40 and into the trough 42. The plant or seeds are planted within the soil. At that point water is introduced into watering tube 70 therefore flowing into water reservoir 80. In the event that too much water is introduced into watering tube 70, the water will begin to flow out of the container holes 24 near the ledge 20. Thus, in the preferred embodiment, the water should never rise above the level of the elevated portion 44 of platform 40. It is more preferable that the water never rise above the first end 74 of watering tube 70. This is to allow for oxygen always to be present in water reservoir 80 so that it may rise through the platform holes 46 into the soil 82. Therefore, first end 74 of watering tube 70 should not protrude much below the elevated portion 44 of platform 40.

When water 84 is present in reservoir 80, the water will flow into trough 42 through trough holes 50. The water will not be saturating the soil well above the elevated portion 44 of the platform 40. The plant draws water from the trough 42 by capillary action. In order to maximize the soil's capability of drawing the water from the trough to portions of the root structure which will remain above the elevated portion 44 of the platform 40, it is preferred that the soil comprise some large porous granules in order to have the maximum number of large voids. That porous soil would comprise peat moss, wood particles, and perlite. In a most preferred embodiment, the plant should be planted in soil which would maximize its porosity and water transmission rates.

The use of this apparatus and method for potting the plant brings about various advantages unobtainable by the prior art devices. One major advantage of using the disclosed apparatus is that it will not allow a plant to be overwatered. The overwatering will be prevented by the container holes 24 near ledge 20. Prior art devices normally had holes near the bottom of the container for drainage allowing excessive disease organisms and parasite growth and water contamination. By having the holes elevated, the grower gains the advantages of having limitless drainage as well as minimizing disease organism growth near the bottom of the container. Those same holes however, also provide much oxygen to the soil bed. The lack of oxygen has been an overlooked problem by prior art devices. However, this device allows an abundance of oxygen to flow through those container holes 24 as well as through the platform holes 46 in the elevated portion 44 of platform 40. As shown in FIGS. 8-10, the container holes 24 are preferably adjacent to the elevated portion 44 of the platform 40 to allow the oxygen to flow directly from outside the container 10 to the soil and roots of the plant.

In use, the water level in the trough 42 will be at least as great as the water level in the water reservoir 80. Capillary action will allow the water level in the soil 82 to rise above the water level in the water reservoir 80. Water reservoir 80 should be refilled when the water level drops below the level of the indentation 52 of floor 56. In the event the apparatus is used outdoors and excessive rain falls into container 10, the water will fall through the soil 82 and through platform holes 46 and into water reservoir 80. Soil nutrients and fertilizers which drain into the reservoir will get recycled into the soil by capillary action. If that rainfall fills water reservoir 80, the water will begin to exit the container 10 through container holes 24.

In a preferred embodiment, the size of the water reservoir 80 is such that it may hold enough water and water soluble fertilizer to propagate and maintain the plant's growth and health for a period of about six weeks. For example, in a circular container of 8" in diameter, the water reservoir 80 should hold approximately 16–40 ounces, preferably 32 ounces. A 16" container preferably should hold approximately 24–132 ounces of water, more preferably 64 ounces. Such large reservoirs allow increased foliage production due to the continuous availability of water and water soluble fertilizers which are continuously being drawn up through capillary action. Moreover, larger reservoirs produce humidity which keeps moisture around the foliage to prevent it from burning or turning brown.

Although the invention has been described in the context of certain preferred embodiments, it is intended that the scope of invention not be limited to the specific embodiment set forth herein, but instead be measured by the claims which follow.

What I claim is:

1. An apparatus for growing plants in which the plant is potted in a container partially filled with a porous soil mix wherein the plant draws water from a water reservoir to the plant's roots by both capillary action through voids in the soil and by direct upward flow from the reservoir but preventing the possibility of oversaturation and where the soil and roots are able to be surrounded by oxygen and the plant foliage by humidity to provide the most beneficial environment for the plant's growth and well being, said apparatus comprising:

a portable open container, having a base, an upper portion, a lower portion, and a plurality of container holes above said lower portion so that said container can hold water in the lower portion;

a platform positioned within said container for resting the soil thereon an capable of supporting the soil above the reservoir, said platform having a plurality of platform holes to allow for the passage of water and oxygen and being at a vertical level proximate to that of the container holes so that the container holes are unobstructed by said platform to allow oxygen to pass directly to the soil from outside said container and so that water cannot remain above said platform after filling the lower portion of said container;

a trough in said platform having two side walls and a floor extending between said side walls, said floor having a plurality of trough holes to allow the water to rise into said trough and periodically saturate the soil contained therein; and a watering tube having a first end proximate said platform and a second end proximate the upper edge of said container so oxygen can travel theretrhough to the water reservoir so that a user can introduce water through said watering tube to fill the lower portion of said container, said apparatus allowing any excess water to flow out through the container holes, and providing the plant oxygen through the container holes and platform holes and water through the trough holes.

2. The apparatus of claim 1, wherein said container is translucent so that the water level within the container can be detected by merely viewing the outside of said container.

3. The apparatus of claim 1, wherein said container holes are vertically oriented adjacent to said platform.

4. The apparatus of claim 1, wherein said trough runs near the outer portion of said platform and parallel to said container.

5. The apparatus of claim 1, wherein said side walls extend from said elevated portion of said platform to said base of said container so that said side walls support the elevated portion of said platform when said platform is subjected to the weight of the soil and the plant.

6. The apparatus of claim 1, wherein said elevated portion of said platform is sloped to prevent water from resting thereon.

7. The apparatus of claim 6, wherein said elevated portion forms a mound with its highest point substantially near the center of said elevated portion.

8. The apparatus of claim 1, wherein said side walls of said trough have a plurality of holes therethrough, said holes large enough to allow water to seep from the water reservoir to the soil within the trough and small enough to prevent excessive amounts of soil from falling therethrough.

9. The apparatus of claim 1, wherein said floor of said trough having a plurality of indentations about said trough holes.

10. The apparatus of claim 1, wherein said container has a ledge, and said container holes are in said ledge.

11. The apparatus of claim 10, wherein said ledge is elevated relative to said elevated portion of said platform.

12. The apparatus of claim 10, wherein said ledge supports the elevated portion of said platform.

13. An apparatus for growing plants in which the plant is potted in a container partially filled with a porous soil wherein the plant draws water from a water reservoir to the plant's roots by both capillary action through the soil mix and by direct upward flow from the reservoir but preventing the possibility of oversaturation and where the soil and roots are able to be surrounded by oxygen and the plant foliage by humidity to provide the most beneficial environment for the plant's growth and health and well being, said apparatus comprising:

an open container;

a platform positioned within said container having an elevated portion and trough portion which has a plurality of trough holes so that soil may be placed in said container and trough and on said elevated portion;

a ledge having container holes unobstructed by said platform to pass oxygen directly to the soil from outside said container; and a watering tube extending through said platform having a first end proximate the elevated portion of said platform and a second end proximate the upper edge of said container and above the soil, said tube permitting the introduction of water beneath said platform and into said trough where the soil on the elevated portion can draw water from the trough by capillary action.

14. The apparatus of claim 13 wherein said elevated portion of said platform rests on said ledge.

15. The apparatus of claim 13, wherein the elevated portion of said platform has a plurality of platform holes for the transmission of oxygen to the soil and for the drainage of the water when necessary.

16. The apparatus of claim 13, wherein said container holes are above said elevated portion of said platform.

17. The apparatus of claim 13, wherein said elevated portion of said platform is sloped to prevent water from resting thereon.

18. The apparatus of claim 13, wherein said trough has two side walls and a floor between said walls, and has a plurality of trough holes in said floor.

19. The apparatus of claim 18, wherein said trough has a plurality of indentations about said trough holes to allow water and air to more easily rise into said trough.

20. The apparatus of claim 13, wherein said second end of said watering tube is connected to an automatic water feed line.

21. The apparatus of claim 13, wherein said container holes are vertically oriented to have an upper end and a lower end, said upper end being at a vertical height at least as great as said elevated portion of said platform.

22. The apparatus of claim 21, wherein said container has a plurality of holes proximate a second ledge for the direct transmission of water to outside the container and oxygen from outside the container to said soil.

23. The apparatus of claim 13, further comprising a decorative pot within which said container is placed.

24. The apparatus of claim 13, wherein said container holes are evenly spaced about said container.

25. The apparatus of claim 13, wherein said container can hold between 16 and 132 ounces of water beneath the elevated portion of said platform.

26. The apparatus of claim 13, wherein said container is circular.

27. The apparatus of claim 26, wherein said container has an upper lower end, said upper end having a diameter greater than the diameter at said lower end.

28. The apparatus of claim 13, wherein said trough portion runs parallel to said container.

29. The apparatus of claim 13, wherein said trough portion has criss-crossed configuration.

30. An apparatus for growing plants in which the plant is potted in a container partially filled with a porous soil wherein the plant draws water from a water reservoir to the plant's roots by both capillary action through the soil and by direct upward flow from the reservoir, but preventing the possibility of oversaturation and where the soil and roots are able to be surrounded by oxygen and the plant foliage by humidity to provide the most beneficial environment for the plant's growth and well being, said apparatus comprising:

an open portable container having a base, an upper portion, and lower portion;

a platform positioned within said container for resting the soil thereon and capable of supporting the soil above the reservoir, said platform having a plurality of platform holes to allow for the passage of water and oxygen;

a ledge having a first and second part, said first part underlying and supporting said platform and said second part being unobstructed by said platform to pass oxygen directly to the soil from outside said container;

a trough in said platform having two side walls and a floor extending between the side walls, a plurality of trough holes, and a strip underneath said floor to elevate said trough floor above said base, said trough running near the outer portion of said platform and substantially parallel to the sides of said container and extending to the bottom of said container so that it may support said platform when subjected to the weight of the soil and the plant, said trough holes allowing the water to rise into said trough and periodically saturate the soil contained therein, said trough thus able to attract and house many of the plant's roots; and a watering tube having a first end proximate said platform and a second end proximate the upper edge of said container so oxygen can travel therethrough to the water reservoir, so that a user can introduce water through said watering tube to fill the lower portion of said container, said apparatus allowing any excess water to flow out through the container holes, and providing the plant oxygen through the container holes and platform holes and water through the trough holes.

31. The apparatus of claim 30, wherein said container holes are vertically oriented and evenly spaced about said container.

* * * * *